G. ROSA.
TIME CONTROLLED STOVE.
APPLICATION FILED JULY 18, 1916.
1,233,511.
Patented July 17, 1917.
3 SHEETS—SHEET 2.
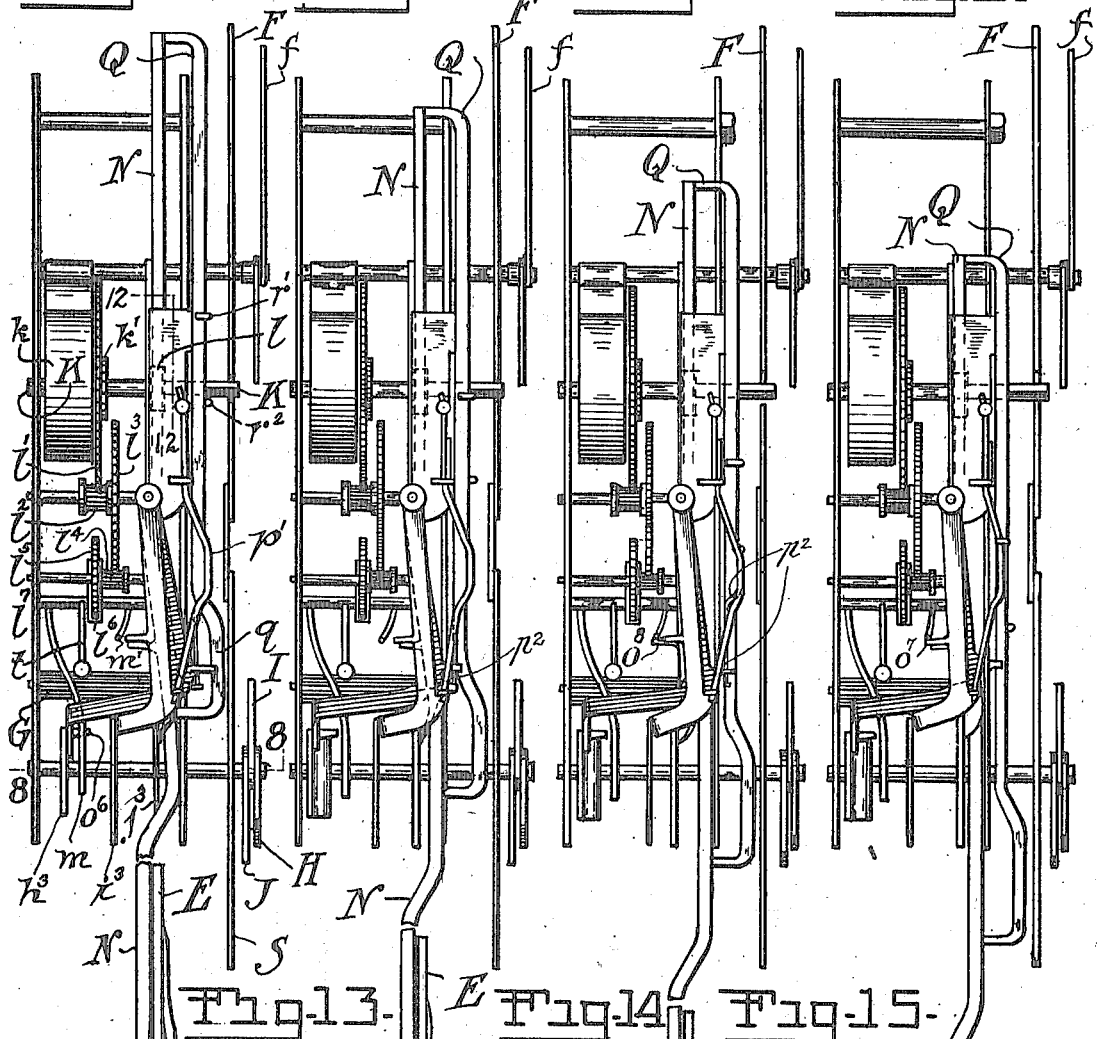
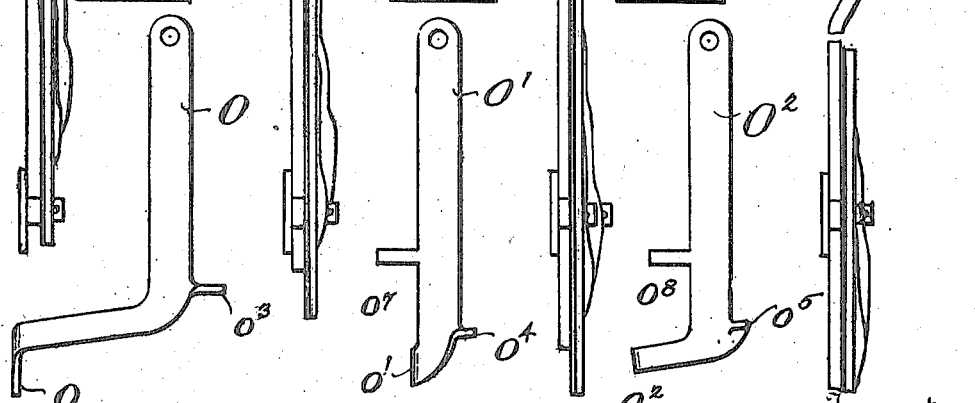
Inventor
Gennaro Rosa.
By His Attorney
Jas H. Griffin

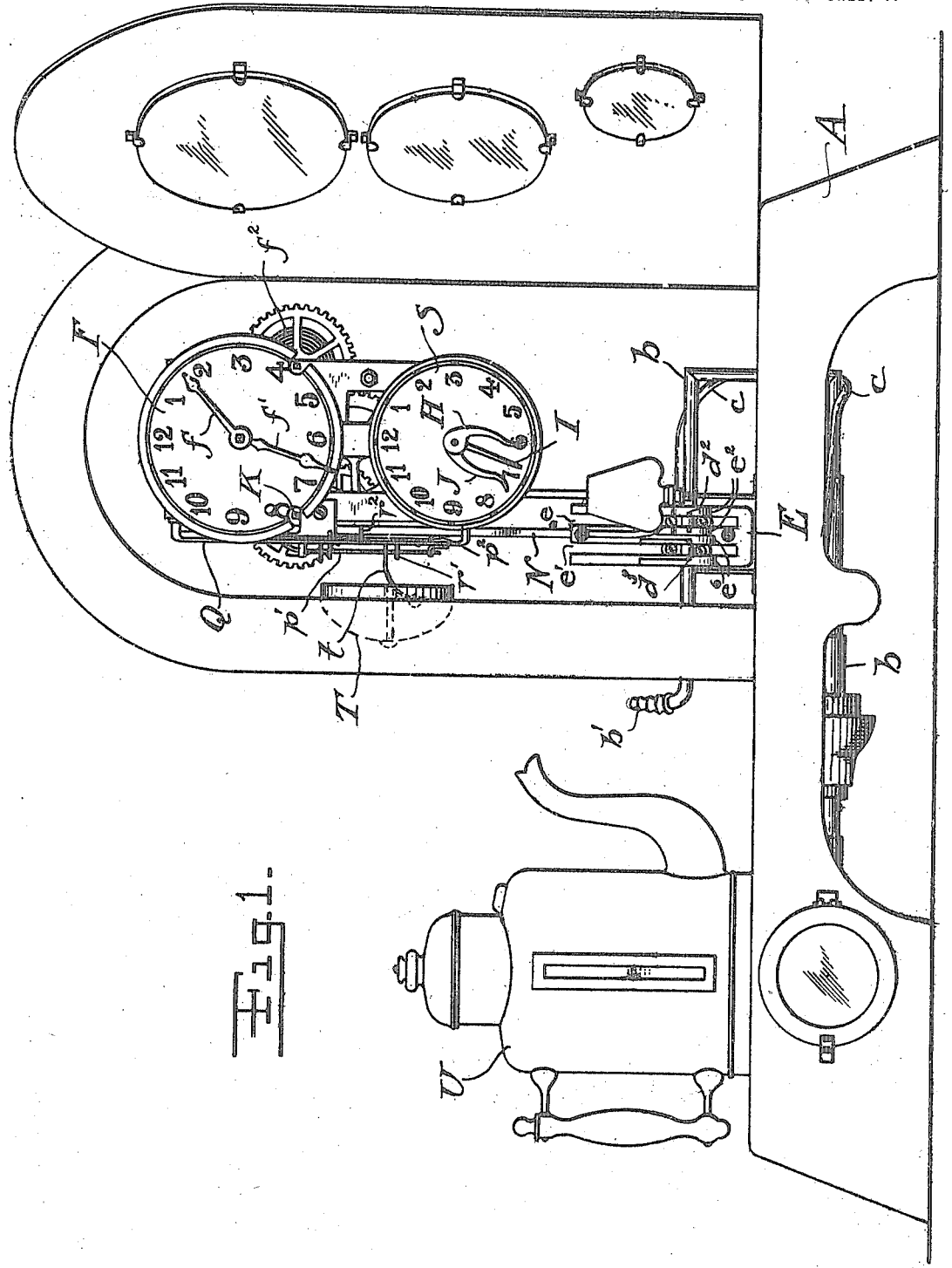

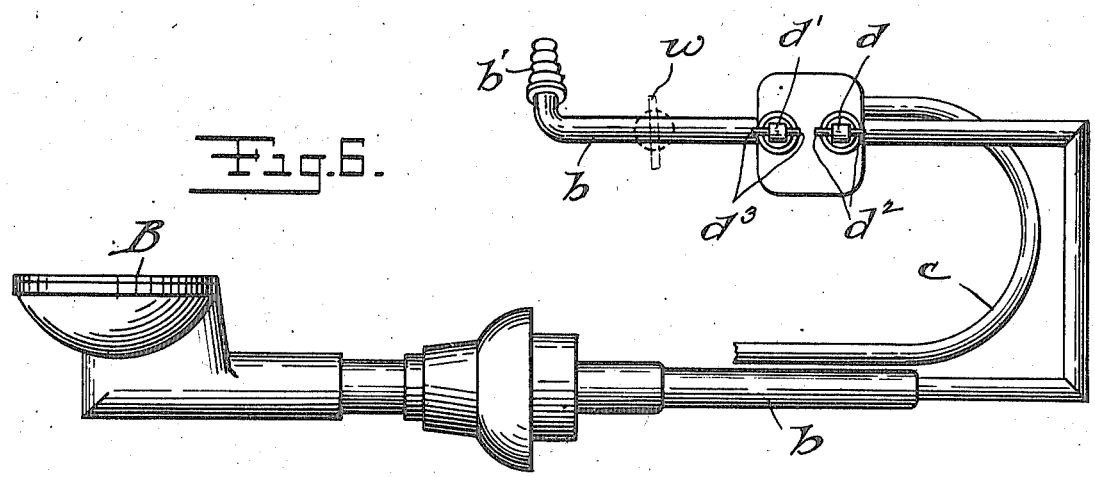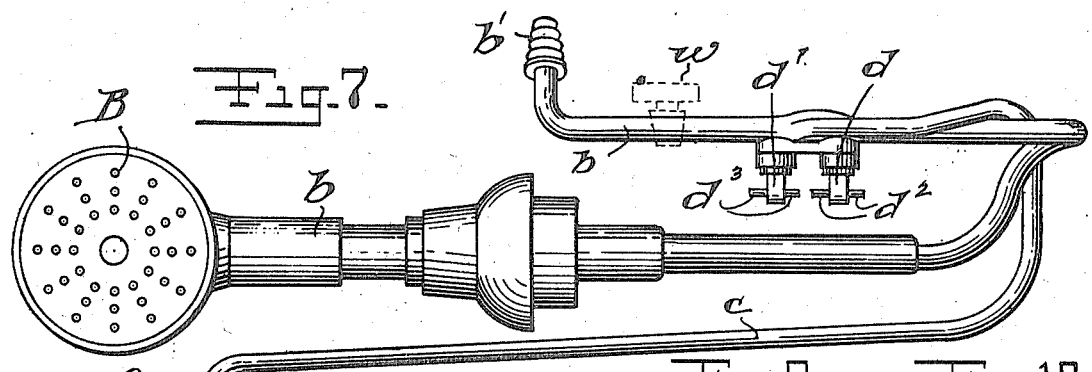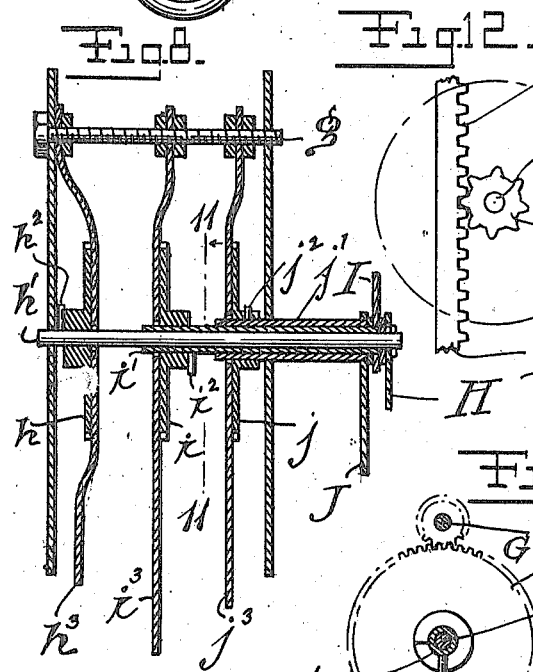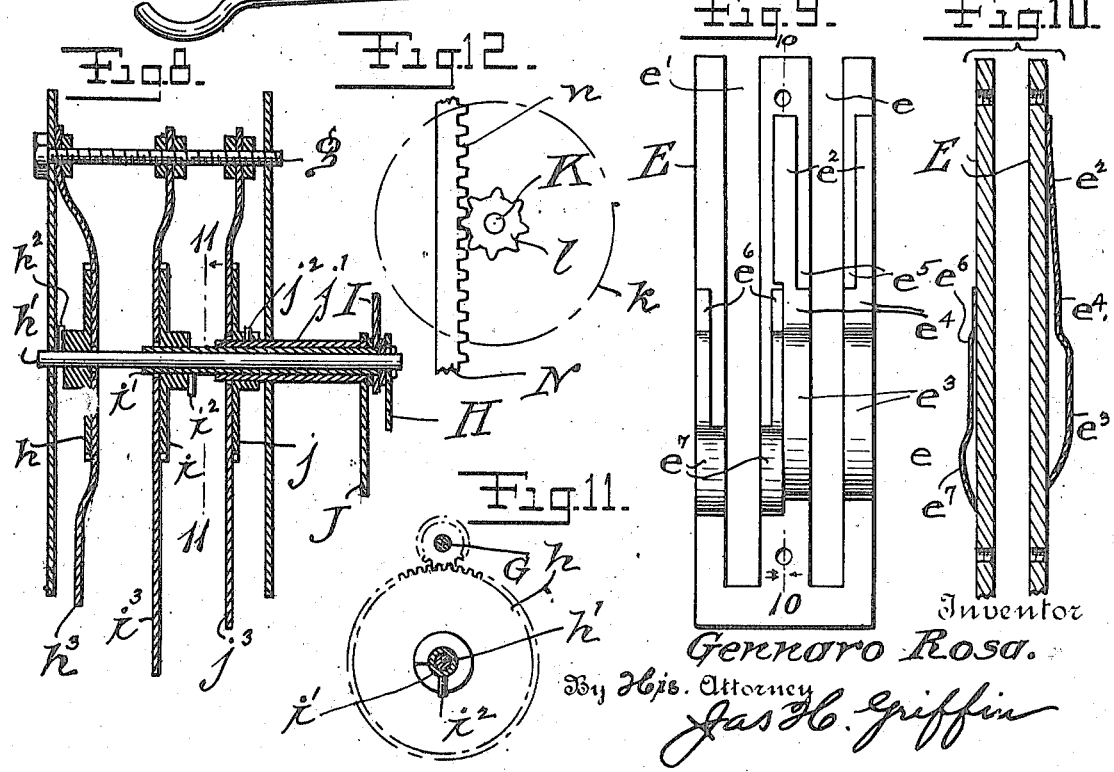

ial filed July 18, 1916. Serial No. 109,959.

UNITED STATES PATENT OFFICE.

GENNARO ROSA, OF BROOKLYN, NEW YORK.

TIME-CONTROLLED STOVE.

1,233,511.   Specification of Letters Patent.   Patented July 17, 1917.

Application filed July 18, 1916. Serial No. 109,959.

*To all whom it may concern:*

Be it known that I, GENNARO ROSA, a subject of the King of Italy, residing in the city of New York, borough of Brooklyn, county of Kings, and State of New York, have invented certain new and useful Time-Controlled Stoves, of which the following is a specification.

This invention is a time-train controlled stove, and the object of the invention is to so combine a stove and time train that the latter will govern the operations of the former. That is to say, the object of the invention is to associate a time train with the controlling devices of a stove in such manner that the stove will be put into operation at a predetermined time, operated to carry out its heating functions for a desired period, and subsequenly automatically turned off.

In the preferred practical embodiment of the invention, the controlling mechanism is so organized that, after the stove is turned on, it is adapted to operate with the desired maximum heating capacity through a predetermined period, is subsequently automatically regulated at the termination of such period to furnish a decreased heat for a further period, at the termination of which the heating operation is automatically concluded.

Features and advantages of the invention other than those specified will be apparent from the following description, read in conjunction with the accompanying drawings.

In the accompanying drawings, I have illustrated one practical embodiment of the present invention, but the construction shown therein is to be understood as illustrative, only, and not as defining the limits of the invention.

Figure 1 is a front elevation of one burner gas stove showing the preferred form of the device of the present invention associated therewith; the door of the clock casing, the clock of which serves as a time-train in this embodiment of the invention, is shown open in the interest of clearness.

Figs. 2, 3, 4 and 5 are side elevations of the time-train and associated controlling mechanism. In these views the parts of the stove are omitted and the controlling mechanism is shown in different positions of its operation.

Fig. 6 is a front elevation of the stove burner, of pipe connections, and the means for directly operating the gas controlling valves.

Fig. 7 is a plan view of the structure shown in Fig. 6.

Fig. 8 is a section taken in the plane of the line 8—8 of Fig. 2.

Fig. 9 is a front elevation of the preferred form of means for actuating the gas controlling valve of the stove.

Fig. 10 shows two sections taken on line 10—10 of Fig. 9 and looking in the direction of the single and double arrows.

Fig. 11 is a section on line 11—11 of Fig. 8.

Fig. 12 is a section on line 12—12 of Fig. 2, and

Figs. 13, 14 and 15 are details of certain levers entering into the preferred form of construction.

Referring to the drawings, A designates a stove provided with a suitable burner B, which is connected by a pipe $b$ to a nipple $b'$, adapted to receive suitable connection, flexible or otherwise, communicating with the gas main. Pipe $b$ is provided with a smaller branch pipe $c$ which leads to a point in close proximity to the burner and being adapted on its free end to burn small flame, serving as a pilot-light for the burner B. The flow of gas through the pipes $b$ and $c$ to the burner and the pilot-light, respectively, is governed by two valves $d$ $d'$, respectively, the valve $d$ controlling flow of gas through pipe $b$ to the burner, and valve $d'$ controlling flow of gas through pipe $c$ to the pilot-light.

Valves $d$ $d'$ may be of any suitable type, but are preferably of the character wherein a spring normally holds the valves seated to prevent the flow of gas, but said valves are adapted to be withdrawn from their seats by tension of their stems to allow of the flow of gas. To allow of the placing of the valve stems under tension to move the valves from their seats against pressure of their respective springs, the stem of the valve $d$ is provided with two laterally extending trunnions $d^2$, while stem of the valve $d'$ has two similar trunnions $d^3$. These trunnions are adapted to coöperate with cam phases formed on a movable plate E, as shown in Figs. 1, 9 and 10.

Plate E, as detailed in Figs. 9 and 10, is, as will hereinafter be explained, movable in a vertical plane, and is provided with two longitudinal passages or slots $e$ $e'$ through which the stems of the valves $d$ $d'$ extend so that their trunnions are positioned forwardly of the front face of the plate. On either side of slot $e$ is a leaf-spring $e^2$, substantially the lower half of each of which is shaped to form a cam having two distinct phases, viz., a lower or high phase $e^3$ and an upper or intermediate phase $e^4$. The lower ends of leaf-spring $e^2$ are formed to contact with the face of plate E so that if the plate is lowered while the stationary object is in contact with the face thereof beneath the lower ends of said leaf-springs, said object will be caused to raise up and pass the lower ends of the springs and mount onto the high phases $e^3$ of the cams which they form.

If the depressing operation of the plate E is continued, the object will leave the high phases $e^3$ of the cam, come into engagement with the intermediate phases $e^4$, and subsequently pass through cut-away portions $e^5$ to again contact with the face of the plate above the cam portions of the springs. This is a manner in which the trunnions are operated by cam portions of said springs. In other words, when the plate is at its highest point, the trunnions contact with the face thereof below the ends of the springs. As the plate is lowered, the trunnions engage with the high phases $e^3$ of said springs and thereby force the trunnions forward, carrying with them the stems of the valve $d$, and opening the valve to its maximum capacity. As downward movement of the plate continues, trunnions come into engagement with the intermediate phase $e^4$ thereby allowing the valve to close to a certain extent and, finally, as the movement of the plate E continues, the trunnions leave the low phase, the intermediate phase $e^4$, and then contact with the front face of the plate E, whereupon the valve $d$ becomes seated and shuts off the supply of gas to the burner.

In a similar manner, the slot $e'$ has provided adjacent its edges two leaf-springs $e^6$, as shown best in Fig. 10, which springs have near their lower ends a bent-up portion constituting a cam surface $e^7$. This cam surface operates in the same manner upon the trunnions $d^3$ as do the cam surfaces $e^3$ upon the trunnions $e^2$. It will be noted that of the four springs, $e^2$ and $e^6$ are secured at their upper ends only so as to leave their lower ends free for movement toward and away from the plate. Thus, the trunnions ride over the cam surfaces of said plates when the plate is depressed, but, when the plate is subsequently raised, the trunnions ride against the face of the plate and beneath the springs and, in so doing, lift the springs away from the face of the plate sufficiently to allow the trunnions to pass back to their initial positions near the bottom of the plate. The association of the parts is such that the valve $d'$ is never quite closed, even when the trunnions $d^3$ are in engagement with the face of the plate. Accordingly, there is always a small supply of gas passing through the pipe $c$, with the result that the pilot-light $c'$ may be kept burning. However, as the plate E is depressed, the trunnions $d^3$ engage with the cam surfaces $e^7$, with the result that the pilot-light is accelerated to such degree as to extend across the face of the burner, as shown in Fig. 7. At about this time, in the operation of the device, the trunnions $d^2$ engage with high phase $e^3$ and turn on the gas to the burner, whereupon the pilot-light serves to light the burner. The downward movement of the plate continuing, the trunnions $d^3$ leave the cam surfaces $e^7$ and thus turn down the pilot-light, while the burner continues to operate with its maximum efficiency. The trunnions $d^2$ subsequently engage with the intermediate phase $e^4$ of plate E and turn down the light of the burner. After continuing in this manner for a space of time hereinafter explained, the trunnions $d^2$ are again brought into engagement with the face of the plate E and the burner turned off.

The foregoing mechanism for regulating the supply of gas is, according to this invention, governed by a time-train, whereby the operations of the plate E are so timed that the gas is turned on at a pre-determined time, remains burning at full efficiency for a desired period, is thereafter turned down for a pre-determined period and, finally, turned off. Coöperating with the time-train is means governed thereby for timing the operations of the plate E so that its periods of actuation will be in accordance with the desires of the operator, as will next be described.

The time-train which I prefer to employ in carrying out this invention, is preferably in the form of any well-known clock mechanism adapted to operate in time synchronism with the passage of the hours of the day. The clock is preferably provided with two hands $f'$ which are mounted in the usual way before a clock face F. The gearing, pinions, escapement, etc., may be of any suitable character and all may be driven from a main spring $f^2$. The details of the clock construction are immaterial, the main feature being that the time-train shall drive a toothed arbor G at a constant speed.

In the preferred embodiment of the invention illustrated, this arbor is shown as meshing with three gears $h$ $i$ $j$. The gear $h$ is loosely mounted on a shaft $h'$ which extends upwardly beyond the front face of the frame which supports the clock works; the gear $i$ is loosely mounted on a concentric sleeve $i'$, which extends outwardly substantially to the end of shaft $h'$; and gear $j$ is similarly mounted on a concentric sleeve $j'$ which likewise extends substantially to the forward end of shaft $h'$.

Adjacent the hub of the gear $h$ is a radially extending finger $h^2$, fixed on shaft $h'$, adjacent the hub of wheel $i$ is a similar projection $i^2$, and in similar manner a projection $j^2$ is fixed on sleeve $j'$ adjacent the hub of gear $j$. The shaft and both of the sleeves are fixed against longitudinal movement but are adapted to be manually rotated independently of one another by means of three pointers H I J fixed on the outer ends of the shaft $h'$ and sleeves $i'$ $j'$, respectively. The hub of the gear $h$ is normally maintained in engagement with projection $h^2$ by means of a leaf-spring $h^3$ fixed to a post $g$, extending into engagement with the face of the gear $h$ and protruding beyond the same, as shown in Fig. 8. In like manner, the hub of gear $i$ is held in engagement with its projection $i^2$ by means of leaf-spring $i^3$, while the hub of gear $j$ is maintained in engagement with its associate projection $j^2$ by a leaf-spring $j^3$. The edges of the hubs which engage with the respective projections are, as shown in Fig. 11, cam-like in form. When the projections are in engagement with the high portion of the cam, or that portion farthest away from the face of the gear, the corresponding leaf-spring will be forced in a direction away from the projection but, as the gear is rotated by the arbor G, bringing the lower portion of its cam-shaped hub into engagement with its corresponding projection, the leaf-spring will be allowed to move into a direction toward the projection.

All of the gears and their coöperating leaf-springs work in this manner and, while the leaf-springs serve to maintain the gears in engagement with their respective projections, the cam-shaped hubs of said gears determine the position of the free ends of the leaf-springs, and it is by virtue of this fact that the time-train governs the operations of the plate E through the following intermediate mechanism.

Mounted within the frame which carries the works of the clock, is an arbor K around which is coiled a spring $k$ connected to arbor K through a pawl and ratchet connection $k'$. The forward end or arbor K projects into accessible position beyond the front plate of the clock frame and is squared to receive a key whereby spring $k$ may be placed under tension. The spring $k$ and arbor K constitute collectively a spring motor which, when released, serves to drive a pinion $l$ fixed on the arbor K. The spring motor is, however, precluded from operating to highest speed, when said motor is released, by a train of gearing, composed of the gears $l'$ $l^2$ $l^3$ $l^4$. On the shaft which carries the gear $l^4$ is also fixed an escapement wheel $l^5$ with which coöperates an oscillating escapement member $l^6$, fixed on an arbor $l^7$ and coöperating with the escapement wheel $l^5$ in the manner common to alarm clocks and other well-known forms of time-trains. This mechanism serves to slow up the operations of the spring motor so that said motor will not "run-away".

As long as the arbor $l^7$ is free to oscillate, the spring motor will slowly rotate the pinion $l$ but, when such oscillation of said arbor is precluded, the motor will be precluded from operating. Accordingly, by controlling the movement of the arbor $l^7$ the operations of the spring motor are controlled. This controlling operation of the arbor is carried out by means of two rigid arms $m$ $m'$, both of which are secured to the arbor $l^7$ and project downwardly therefrom to be operated upon by stop means hereinafter described.

The function of the spring motor K, when released, is to operate plate E, hereinbefore described, so that said plate may be depressed upon the operation of the spring motor when same is released and may be subsequently elevated to its initial position by the manual winding up of the motor. To this end plate E is affixed to the lower end of a rod N, as shown in Figs. 1 to 5, inclusive, and the upper portion of said rod is made in the form of a rack $n$, the teeth of which rack $n$ are adapted to mesh with the pinion $l$ in the manner shown on Figs. 2 and 12. By this construction, the rotation of the pinion under impulse of the spring $k$ will depress rod N, whereas the subsequent winding up of the spring will rotate the pinion in the opposite direction and again elevate the rod.

Mounted for pivotal movement upon the clock frame on that side thereof adjacent rod N, are three levers O O' O², shown in detail in Figs. 13, 14 and 15, respectively, and with forwardly extending operating projections $o^3$ $o^4$ $o^5$. Levers O' and O² have formed upon their bodies rearwardly extending fingers $o^7$ $o^8$. The levers O' O² are normally maintained in forward positions by springs $p'$ $p^2$, respectively, while lever O is normally maintained in a forward position by the contact of its foot with a leaf-spring $h^8$.

The parts are so organized that when the levers are in their forward positions the fingers $o^7$ $o^8$ of the levers O' O² are free from engagement with projecting arm $m'$ of the escapement arbor $l^7$, whereas, when the lever O is in a forward position, a projection $o^6$ formed on the spring $h^3$ is in engagement with the arm $m$ of said arbor.

It will be remembered that as long as the arbor $l^7$ is free to oscillate the spring motor will operate, but, as soon as such operation of the arbor is precluded, as by some member coming into engagement with either of the arms $m$ $m'$, the oscillatory movement will be stopped and the motor will be held in check. With this in mind, it will be apparent that when the levers are in the forward positions described, the arms $m'$ will be unobstructed, but the lever $m$ will be engaged by the finger $o^6$ of the lever O and will, accordingly, preclude the operation of the motor. If, however, the leaf-spring $h^3$ is depressed sufficiently to move its finger $o^3$ out of engagement with arm $m$, the checking action of the spring motor will cease and the motor will operate to depress the rod N. Moreover, this operation will continue until either the finger $o^6$ is returned to its normal position, or until either one of the levers O' O² is swung back to such position that their fingers $o^7$ $o^8$ will engage with the arm $m'$.

It will be recalled that after the time-train, operating through toothed arbor G, has rotated the gear $h$ to a position wherein its coöperating projection $h^2$ enters the lower portion of the cam surface of its hub, the spring $h^3$ is forced backwardly, and this forcing operation is of such extent as to free the arm $m$ from the projection $o^6$ and allow the spring motor to start its operation. This operation will, of course, continue until the time-train has rotated the arbor sufficiently to turn the gear $h$ to such extent as to again raise the projection $h^2$ from the low point of the cam, and the finger $o^6$ will then be brought into engagement with the arm $m$ and the motor will be stopped.

It is desirable, for reasons hereinafter manifest, that when the spring $h^3$ has once been depressed it remains depressed so as to no longer interfere with the spring-motor during one complete operation. This is accomplished through the medium of a guide rod Q which is mounted on the rod N and extends forwardly thereof, as shown in Figs. 2 to 5, inclusive. Guide rod Q extends for the greater portion of its length in parallel relation to the rod N, but near its lower end it has a forwardly extending portion $q$, as shown best in Figs. 2 to 5. The finger $o^3$ of the lever O is adapted at all times to engage with the adjacent edge of the rod Q. Thus, when the rod N is elevated, projection $o^3$ engages with the off-set portion $q$ of rod Q and allows the finger $o^6$ on the leaf-spring $h^3$ to engage with the arm $m$.

If the leaf-spring $h^3$ is depressed, through the medium of gear $h$, as hereinbefore described, and thereby serves to release the motor and allow of the downward movement of the rod N, the rod will be depressed sufficiently before the spring is again raised to bring the projection $o^3$ to the parallel portion of the guide Q, i. e., above the off-set portion $q$. This change of position of the guide Q will pivotally move the lever O into the position shown in Fig. 3, wherein it will engage again with the spring $h^3$ and hold the spring in depressed position with the finger $o^6$ and out of engagement with the arm $m$. As there is no other off-set portion in the guide Q, the spring $h^3$ will hold in this position through the entire downward travel of the rod N and will, accordingly, not interfere again with the operation of the spring motor.

It will be noted however, particularly from Figs. 2 to 5, inclusive, that the guide Q carries two lateral projecting fingers $r'$ $r^2$ which are so positioned as to engage with the springs $p'$ $p^2$, respectively, as the rod N is depressed, and by engaging with said springs, serve to force the levers O² O', respectively, in a backward direction to bring the projection $o^8$ or $o^7$ into engagement with the arm $m'$ for the purpose of checking the spring motor.

Thus, after the spring motor has been allowed to start operation by the depressing of the spring $h^3$, through the operation of the gear $h$, it continues to operate until the projection $r^2$ comes into engagement with spring $p^2$ and forces projection $o^7$ into engagement with arm $m'$. This checks the motor so that its further operation is precluded until the time-train has rotated the gear $j$ sufficiently to move the leaf-spring $j^3$ forwardly, by which operation the lever O' is shifted, with the foot $o'$ with which it is in engagement, and such movement releases the arm $m'$ from engagement with the projection $o^7$, thereby allowing the motor to again operate to further depress rod N until the projection $r'$ comes into engagement with the spring $p'$ and forces the lever O² into position whereby its projection $o^8$ engages with the arm $m'$. This checks the motor again and maintains it in check until gear $i$ has operated upon leaf-spring $i^3$ to allow said spring to move forwardly. Forward movement of said spring similarly moves the lever O², the foot $o^2$ of which engages with said spring and thereby forces the projection $o^8$ free from engagement with the arm $m'$ and allows the spring motor to again operate for the purpose of depressing rod N to the terminal of its downward travel.

In order that the checking and releasing operations of the motor may be properly timed to operate at desired intervals with relation to the timed operation of the arbor G, a suitable dial S, such as shown in Fig. 1, is preferably positioned back of the pointers or fingers H I J. This dial has designated thereon the hours of the day, and the several hands or fingers enumerated are moved to positions on the dial at which time it is desired to have the mechanism, which they control, operate, much in the same manner that the setting of the pointer of an alarm clock is operated to regulate or determine the time at which the alarm is to go off.

Thus, if it is desired that the burner be turned on at six o'clock, the pointer H is moved to VI on the dial S. If it is desired to have the light turned down at 6:45, pointer I is moved to a position equivalent to 6:45 o'clock and, if it is desired to have the burner turned off at 7:30, pointer J oc cupies such position relative to the dial.

With such regulation, the time-train will, operating through the arbor G, release spring $h^3$ at six o'clock and allow the depressing operation of the rod to such extent as to bring the trunnions $d^2$ and the high phases $e^3$ of the plate E and simultaneously bring the trunnions $d^3$ into engagement with high phases $e^7$ of said plate. This will serve to first turn up the pilot-light and then turn on the burner to full efficiency immediately following which the pilot-light is again turned down. At about the time the pilot-light is turned down, the projection $r^2$ comes into engagement with the spring $p^2$ and checks the spring motor in the manner described, leaving the plate E in a position wherein the burner is operating at its maximum efficiency.

This state of facts continues with all parts at rest, except the time-train, which is slowly turning the gear $j$ through the arbor G. At the expiration of the period of time between six o'clock and six forty-five o'clock, gear $j$ will have been turned sufficiently to bring its coöperating projection $j^2$ at the low point of its cam-shaped hub, whereupon spring $j^3$ will be moved forwardly and, by such operation, will release the spring motor. The motor will operate until the projections $r'$ comes into engagement with the spring $p'$, which operation will again check the motor. During this interval, however, the plate E will have been lowered to bring the trunnions $d^2$ onto the intermediate phase $e^4$ of plate E, and the burner will have been turned down.

As the time-train continues to operate, it finally rotates gear $i$ into a position to release its spring $i^3$, and said spring operates upon lever $O'$ to again release the spring motor and allow the plate E to be depressed to its lowermost position, during which operation the gas will be turned off.

A bell T is preferably associated with the structure and said bell is operated upon by a clapper $t$ mounted upon the oscillating arbor $l^7$ of the escapement means so that whenever the motor operates, an audible signal is given. Thus, a person may be advised as to the operations of the mechanisms of this invention.

The present invention is particularly applicable for the employment of heating coffee, tea, etc. in the morning since, through the medium of this invention, a person may set the mechanism the night before, wind up the spring motor, and place a coffee pot U, or other vessel, upon the stove and be assured that at the proper time in the morning, as determined by the regulations of the controlling pointers, it will turn on the burner, boil the coffee and finally turn off the heat. These operations will be accompanied by the audible signal T which a person, lying in bed, may hear and know, upon hearing the third ring of the bell, that the coffee is prepared and will not have to wait upon rising for the coffee to boil. It will be understood, however, that the present invention is not restricted to the boiling of coffee and that the lapse of time need not necessarily be an over-night period, this instance being illustrative only.

It will, of course, be understood that the structure hereinbefore described and shown in the drawings, viz., a structure wherein the time-train operates to govern or control only one burner, is advanced for the purposes of illustration, only, and the details of the construction may be changed from time to time in adapting the invention to its different environments. For example, two or more burners may be included in the pipe B, and a corresponding number of pilot connections may be led off in the form of branch pipes from the pipe $c$ so that the valves $d$ $d'$ will simultaneously control all of the burners and all of the pilot-lights. Moreover, while the one-burner stove is shown, the parts may be duplicated so that the stove will have two burners, with separate and distinct mechanism for controlling each burner or, if desired, the valve operating means for each distinct burner may be controlled from a common time-train actuating two arbors, similar to the arbor G, with each of which is associated independent valve operating mechanism.

For the foregoing reasons, the showing herein made is to be understood as illustrative, only, and not as defining the limits of the invention which is as broadly novel as is commensurate with the appended claims.

Although not essential, it is desirable that a valve $w$ be included in the common pipe from the main in the construction shown in the drawings, which valve is shown in dotted lines in Figs. 6 and 7. This valve allows of the complete turning off of the gas, independent of the valves $d$ $d'$. It will, of course, be understood that the present invention is not restricted for use with gas stoves, as the movable plate E may have thereon a plurality of electrical contacts which are adapted to coöperate with associated stationary contacts as when the present invention is adapted to control electrical heating apparatus. In the latter embodiment, the valve $w$ will take the form of a switch.

Having thus fully described the invention, what I claim as new, and desire to secure by Letters Patent, is:

1. An apparatus for automatically lighting and extinguishing gas burners, embodying three concentric shafts driven by timing mechanism each of which shafts carries a pin, said pins being adapted to release holding pawls at three predetermined times to permit of predetermined extent of movement of a slidable cam carrying member adapted to open or close two gas valves a predetermined extent.

2. In an apparatus for automatically lighting and extinguishing gas burners, the combination of a plurality of concentric shafts, a time train for driving said shafts, a valve operating means, actuating means for the valve operating means, a plurality of pawls for normally restraining the operation of the valve operating means, and pins carried by said shafts for releasing the restraining pawls at predetermined times.

3. An apparatus for automatically lighting and extinguishing gas burners, embodying a slidable cam plate for operating a gas valve, means for imparting sliding movement to said plate, and detents for normally restraining the plate operating means, in combination with a plurality of concentric shafts each of which is provided with a trip for releasing one of the detents, and a time train for actuating said shafts.

4. An apparatus for automatically lighting and extinguishing gas burners, embodying a slidable plate provided with means for operating a plurality of gas valves in predetermined succession, means for imparting sliding movement to said plate, means for normally holding the plate operating means in check, a time train, and means controlled by the time train for releasing the plate operating means to allow of sliding movement of the plate and consequent operation of the gas valves.

5. An apparatus for automatically lighting and extinguishing gas burners, embodying a slidable plate provided with means for operating a plurality of gas burners in predetermined succession, means for imparting sliding movement to said plate, means for normally holding the plate operating means in check, a time train, a plurality of concentric shafts driven by the time train and connections between said shafts and the checking means for releasing the same at predetermined times to permit of a predetermined extent of movement of the slidable cam plate.

In testimony whereof I have signed my name to this specification.

GENNARO ROSA.